(12) United States Patent
Ichimura et al.

(10) Patent No.: US 9,313,450 B2
(45) Date of Patent: Apr. 12, 2016

(54) MOBILE TERMINAL, REMOTE OPERATION SYSTEM, DATA TRANSMISSION CONTROL METHOD BY MOBILE TERMINAL, AND NON-TRANSITORY COMPUTER READABLE MEDIUM

(75) Inventors: Shigehiro Ichimura, Kawasaki (JP); Naoki Shiota, Kawasaki (JP)

(73) Assignee: NEC CORPORATION, Tokyo (JP)

( * ) Notice: Subject to any disclaimer, the term of this patent is extended or adjusted under 35 U.S.C. 154(b) by 151 days.

(21) Appl. No.: 13/817,116

(22) PCT Filed: Sep. 6, 2011

(86) PCT No.: PCT/JP2011/004979
§ 371 (c)(1),
(2), (4) Date: Feb. 14, 2013

(87) PCT Pub. No.: WO2012/032762
PCT Pub. Date: Mar. 15, 2012

(65) Prior Publication Data
US 2013/0147897 A1 Jun. 13, 2013

(30) Foreign Application Priority Data

Sep. 10, 2010 (JP) ................................ 2010-202694

(51) Int. Cl.
*H04N 7/14* (2006.01)
*H04W 12/06* (2009.01)
*H04W 60/00* (2009.01)
*H04M 1/725* (2006.01)
*H04M 11/00* (2006.01)

(52) U.S. Cl.
CPC .......... *H04N 7/141* (2013.01); *H04M 1/72522* (2013.01); *H04M 11/007* (2013.01); *H04W 12/06* (2013.01); *H04W 60/00* (2013.01); *H04M 2203/257* (2013.01)

(58) Field of Classification Search
USPC .................. 348/14.01, 14.08, 211.2; 455/419
See application file for complete search history.

(56) References Cited

U.S. PATENT DOCUMENTS

2001/0042114 A1* 11/2001 Agraharam et al. .......... 709/223
2002/0103765 A1* 8/2002 Ohmori ........................ 705/67
(Continued)

FOREIGN PATENT DOCUMENTS

CN 1606272 A 4/2005
CN 1694405 A 11/2005
(Continued)

OTHER PUBLICATIONS

International Search Report (ISR) (PCT Form PCT/ISA/210) dated Nov. 1, 2011, in PCT/JP2011/004979.
(Continued)

*Primary Examiner* — Joseph J Nguyen
(74) *Attorney, Agent, or Firm* — McGinn IP Law Group, PLLC

(57) ABSTRACT

A remote operation system includes a user terminal and a mediation server. The mediation server is configured to execute a registration procedure to start a remote operation of the user terminal from a support terminal. The user terminal includes a telephone function unit, and is configured to allow transmitting, from the user terminal to the mediation server, registration data regarding the remote operation on a condition that the telephone function unit is performing a telephone call.

24 Claims, 7 Drawing Sheets

(56) References Cited

U.S. PATENT DOCUMENTS

| | | | |
|---|---|---|---|
| 2003/0220097 A1* | 11/2003 | Aono et al. | 455/410 |
| 2004/0109587 A1* | 6/2004 | Segawa et al. | 382/115 |
| 2005/0146621 A1* | 7/2005 | Tanaka et al. | 348/211.2 |
| 2006/0206790 A1* | 9/2006 | Komamura et al. | 715/500 |
| 2009/0125429 A1* | 5/2009 | Takayama | 705/35 |
| 2010/0149305 A1* | 6/2010 | Catchpole et al. | 348/14.08 |
| 2011/0219132 A1* | 9/2011 | O'Reilly et al. | 709/229 |

FOREIGN PATENT DOCUMENTS

| | | |
|---|---|---|
| CN | 101335909 A | 12/2008 |
| CN | 101588413 A | 11/2009 |
| JP | 2000-196770 A | 7/2000 |
| JP | 2002-368868 A | 12/2002 |
| JP | 2006-191284 A | 7/2006 |
| JP | 2008-103828 A | 5/2008 |
| JP | 2008-210397 A | 9/2008 |
| JP | 2009-232359 A | 10/2009 |

OTHER PUBLICATIONS

Chinese Office Action dated Sep. 2, 2014 with an English translation thereof.

Decision to Grant a Patent dated Oct. 6, 2015 with a partial English Translation.

* cited by examiner

MOBILE TERMINAL, REMOTE OPERATION SYSTEM, DATA TRANSMISSION CONTROL METHOD BY MOBILE TERMINAL, AND NON-TRANSITORY COMPUTER READABLE MEDIUM

TECHNICAL FIELD

The present invention relates to a remote operation system which is able to operate a user terminal, such as a mobile telephone terminal, from a support terminal which is remotely located.

BACKGROUND ART

A remote operation system is known which remotely operates a user terminal, such as a mobile telephone terminal, from a support terminal (see, for example, Patent Literature 1). With the use of a remote operation system, setting and operations of a user terminal (e.g., mobile telephone terminal, personal computer and the like) or an application program installed in the user terminal can be performed from the support terminal which is remotely located. Accordingly, a remote operation system can be used for a remote support in which an operator remotely located supports a user who is not familiar with operations of a mobile telephone terminal, a personal computer or the like. The term "remote operation" in this specification includes performing an input operation on a remote terminal which is remotely located, monitoring a display screen of a remote terminal which is remotely located, changing setting of a remote terminal which is remotely located, or transferring data to a memory of a remote terminal which is remotely located.

In the remote support, in order to allow a remote operation of a user terminal from an operator who is remotely located (hereinafter referred to as a supporter), a procedure to authenticate the supporter by a user is used. In this authentication procedure, the user is required to operate the user terminal to input information for authenticating the supporter, and to transmit this information to a server. This procedure for authenticating the supporter by the user is to ensure security for preventing such a situation in which an unspecified third party remotely operates the user terminal.

CITATION LIST

Patent Literature

Patent Literature 1: Japanese Unexamined Patent Application Publication No. 2009-232359

SUMMARY OF INVENTION

Technical Problem

However, users who require the remote support are expected to have low information literacy. For starting a remote support, it is typically performed to demand explicit permission by a user regarding a remote operation of the user terminal in order to ensure the security. However, since the user and the supporter are remotely located with each other, the user has to perform terminal operations including user registration for a remote operation, and input and transmission of permission data to receive the remote support, in a state where the user does not directly meet the supporter. However, people having low information literacy may feel anxiety about such a terminal operation in a state where the user does not directly meet the supporter, which inhibits the spread of use of the remote support service. Further, an erroneous terminal operation by the user may cause a remote operation performed by a third party different from the supporter intended by the user.

The present invention has been made in order to solve the aforementioned problems, and aims to provide a mobile terminal, a remote operation system, a data transmission control method by a mobile terminal, and a program, that are capable of preventing an unintended remote operation due to an erroneous terminal operation by a user, and improving security when starting a remote operation.

Solution to Problem

In a first aspect of the present invention, a mobile terminal includes a telephone function unit, a transmission unit, and a restriction unit. The transmission unit is configured to transmit, to a mediation server, registration data regarding a remote operation of the mobile terminal from a support terminal. The restriction unit is configured to allow transmission of the registration data on a condition that the telephone function unit is performing a telephone call.

In a second aspect of the present invention, a remote operation system includes a user terminal, a support terminal, and a mediation server. The mediation server is configured to execute a registration procedure to start a remote operation of the user terminal from the support terminal. The user terminal includes a telephone function unit, and is configured to allow transmission of registration data, regarding the remote operation, from the user terminal to the mediation server on a condition that a telephone call is being performed by the telephone function unit.

In a third aspect of the present invention, a data transmission control method by a mobile terminal includes allowing transmission of registration data, regarding a remote operation of the mobile terminal with a support terminal, to a mediation server on a condition that telephone function means included in the mobile terminal is performing a telephone call.

In a fourth aspect of the present invention, a program causes a computer to execute the method according to the third aspect of the present invention described above.

Advantageous Effects of Invention

According to aspects of the present invention stated above, it is possible to provide a mobile terminal, a remote operation system, a data transmission control method by a mobile terminal, and a program, that are capable of preventing an unintended remote operation due to an erroneous terminal operation by a user, and improving security when starting a remote operation.

DESCRIPTION OF EMBODIMENTS

In the following description, specific embodiments of the present invention will be described in detail with reference to the drawings. Throughout the drawings, the same components are denoted by the same reference symbols, and overlapping description will be omitted as appropriate for the sake of clarification of description.

First Embodiment of the Present Invention

Figure 1:
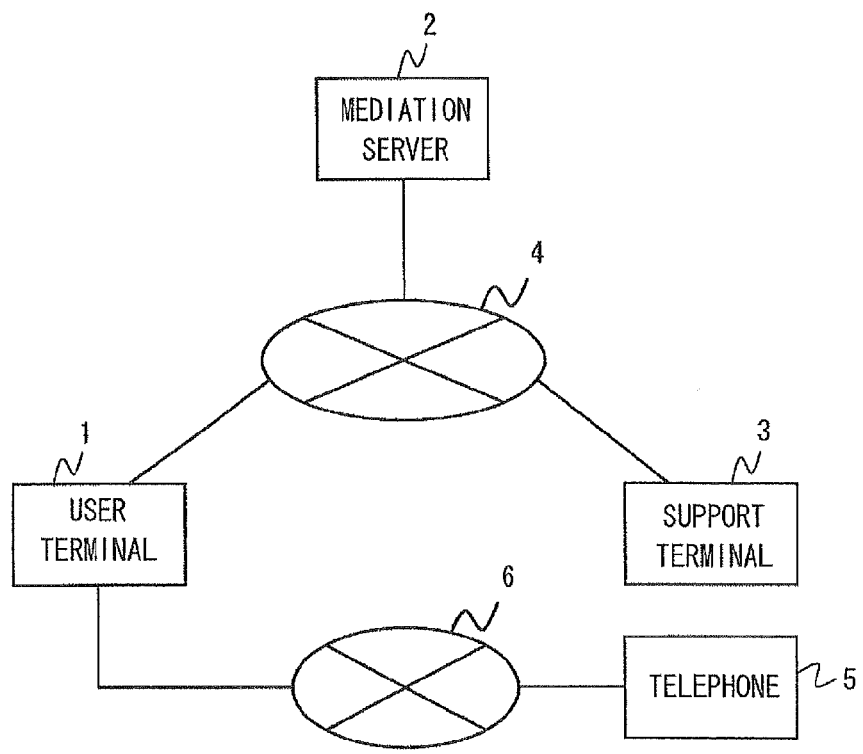
FIG. 1 is a diagram showing a configuration example of a remote operation system according to a first embodiment of the present invention.

FIG. 1 shows a configuration example of a remote operation system according to this embodiment. A user terminal 1 and a support terminal 3 are mobile telephone terminals, personal computers or the like. The user terminal 1 and the support terminal 3 each include an input device (e.g., an operation button, a touch panel, a mouse, a key board, a microphone, or a camera), an output device (e.g., a display, or a speaker), and a wireless or wired communication device. A mediation server 2 is a typical computer. The user terminal 1 has a telephone function, and is able to perform communication (telephone call) with a telephone terminal 5 via a network 6. For example, a line of the telephone terminal 5 is assigned a telephone number to be capable of performing a telephone call with a supporter who uses the support terminal 3.

The mediation server 2 is connected to the user terminal 1 and the support terminal 3 via a network 4. The mediation server 2 mediates a remote operation of the user terminal 1 from the support terminal 3. More specifically, the mediation server 2 executes a procedure for registering the user terminal 1 prior to the start of a remote operation. The mediation server 2 may further execute a procedure for registering the support terminal 3. When the registration of the user terminal 1 is completed and the authentication of the support terminal 3 is successfully performed, the mediation server 2 relays data, regarding a remote operation, between the support terminal 3 and the user terminal 1. Any known procedure used in Internet services or the like to register and authenticate terminals or users thereof may be used as the registration procedure performed by the mediation server 2.

The network 4 is a data transfer network such as an IP network, and includes, for example, a radio access network and a packet core network of a mobile operator, an IP dedicated line, or a public Internet.

Further, the user terminal 1 according to this embodiment includes a function of suppressing transmission of registration data, regarding a remote operation of the user terminal 1 from the support terminal 3, to the mediation server 2. The registration data here may be any kind of data that the mediation server 2 needs to obtain from the user terminal 1 prior to the start of a remote operation of the user terminal 1 from the support terminal 3. The registration data includes, for example, user information associated with the user terminal 1 or the user. The user information may be any kind of information that can identify the user terminal 1 or the user. For example, the user information may be a host name set in the user terminal 1, an IP address of the user terminal 1, the name, a nickname, a telephone number, or an e-mail address of the user, or the combination thereof. The registration data may include supporter information associated with the supporter or the support terminal 3. For example, the supporter information may be a host name set in the support terminal 3, an IP address of the support terminal 3, the name, a nickname, a telephone number, or an e-mail address of the supporter, or the combination thereof. The registration data may include any kind of user verification information transmitted from the mediation server 2 to the user terminal 1 in advance, such as a confirmation code specified by the mediation server 2, a URL (Uniform Resource Locator) for user registration, a one-time password, or the like. The user verification information is information transmitted from the mediation server 2 to the user terminal 1 in association with the procedure for registering the user terminal 1. For example, it can be determined that the user has authenticated the supporter by a reply of the user verification information from the user terminal 1. In this case, the mediation server 2 may perform registration of the user terminal 1 for a remote operation upon receiving the reply of the user verification information from the user terminal 1.

Figure 2:
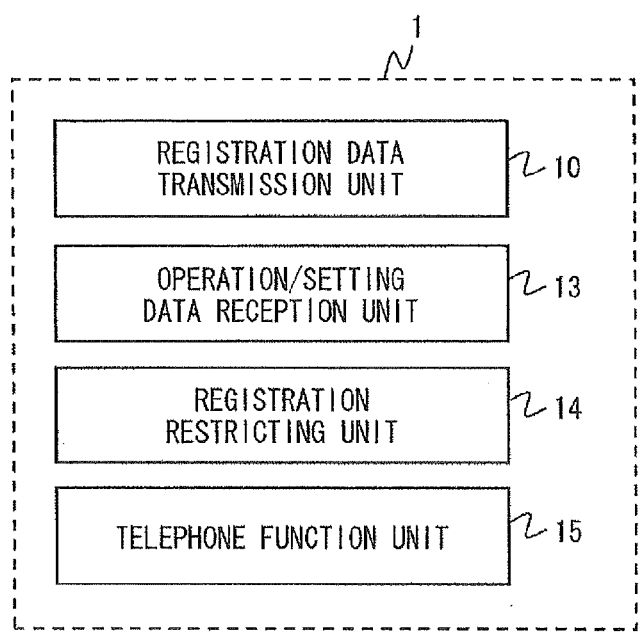
FIG. 2 is a block diagram showing a configuration example of a user terminal according to the first embodiment of the present invention.

FIG. 2 is a block diagram showing a configuration example of the user terminal 1. FIG. 2 only shows main components of this embodiment. A registration data transmission unit 10 transmits the registration data stated above to the mediation server 2.

An operation/setting data reception unit 13 receives data regarding remote operation/setting with the support terminal 3 via the mediation server 2, and performs an operation, configuration update or the like of the user terminal 1 based on this data. At the phase of executing a remote operation after completion of the registration of the user terminal 1 and the authentication of the support terminal 3, the user terminal 1 and the support terminal 3 may directly transmit and receive data regarding the remote operation/setting each other without passing through the mediation server 2. Specifically, a connection (e.g., TCP (Transmission Control Protocol) connection) may be established between the user terminal 1 and the support terminal 3.

A registration restricting unit 14 allows transmission of the registration data to the mediation server 2 from the registration data transmission unit 10 on a condition that a telephone function unit 15 is executing a voice call. The registration restricting unit 14 may perform the operation according to a transmission instruction by the registration data transmission unit 10.

Figure 3:
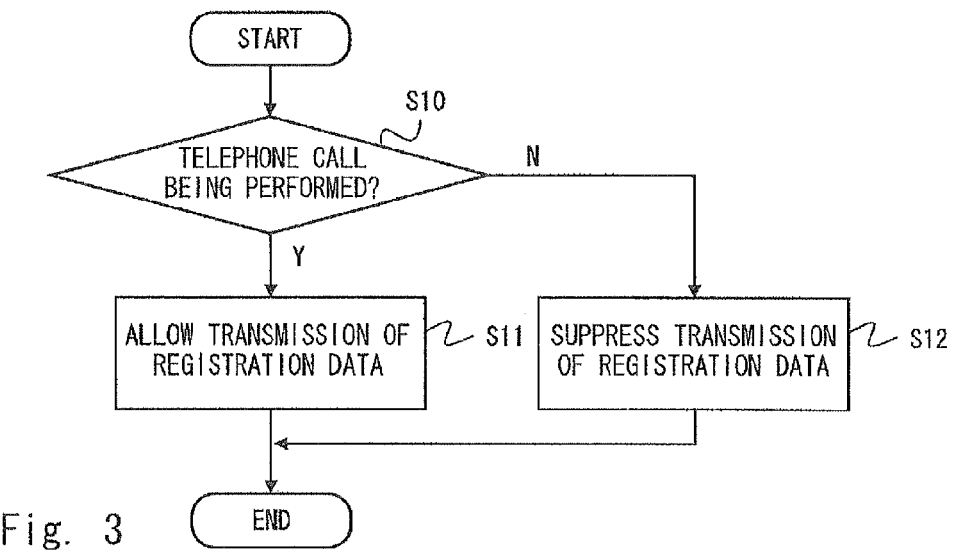
FIG. 3 is a flowchart showing a specific example of registration restricting processing by the user terminal according to the first embodiment of the present invention.

FIG. 3 is a flowchart showing a specific example of an operation of the registration restricting unit 14. In Step S10, the registration restricting unit 14 determines whether a telephone call is being performed by the telephone function unit 15. When a telephone call is being performed, the registration restricting unit 14 allows transmission of the registration data (Step S11). Meanwhile, when the telephone call is not being performed, the registration restricting unit 14 suppresses transmission of the registration data (Step S12).

According to this embodiment, the user makes a telephone call (typically a telephone call with the supporter), and performs a terminal operation while verifying such as a voice of the supporter. In this way, according to this embodiment, it is possible to suppress such a situation where the terminal 1 is operated by a third party when the user terminal 1 is lost and transmission of the registration data for a remote operation is performed, and to improve the security. In particular, in the remote support, there are many cases that users ask supporters questions about operations/settings by telephone, and the supporters start remote operations according to the questions. Further, the user may face such a situation at any time in which he/she does not know which operation to perform. Thus, the request by the user for the support and a remote operation by the supporter in response to the request are often close in time. Accordingly, even when the transmission of the registration data that is required to start a remote operation is limited only to time during which a telephone call is performed, this would not cause any further inconvenience for the user.

As a variant example of this embodiment, when the registration data includes supporter information, the telephone number of the call destination may be automatically set to the supporter information. Accordingly, it is possible to eliminate the need of input by the user, and to avoid an input error.

Further, when the registration data includes the supporter information, if the telephone number included in the supporter information input by the user is different from the telephone number of the call destination, the registration restricting unit 14 may warn the user by warning display or warning sound using the output device (display, speaker or the like) included in the terminal 1. In this way, it is possible to reduce the probability that an erroneous telephone number is transmitted as the registration data.

Further, as a variant example of this embodiment, the telephone function unit 15 may support a videophone, and the registration restricting unit 14 may allow transmission of the registration data on a condition that a videophone call is being performed by the telephone function unit 15. According to such a variant example, the user is able to visually verify a face of a person on the call using the videophone, which makes it possible to further prevent an erroneous operation by the user and to improve the security.

The functions of the registration data transmission unit 10 and the registration restricting unit 14 of the user terminal 1 described in this embodiment may be implemented by causing a computer including a microprocessor or a CPU (Central Processing Unit) to execute one or a plurality of programs.

These programs can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Figure 4:
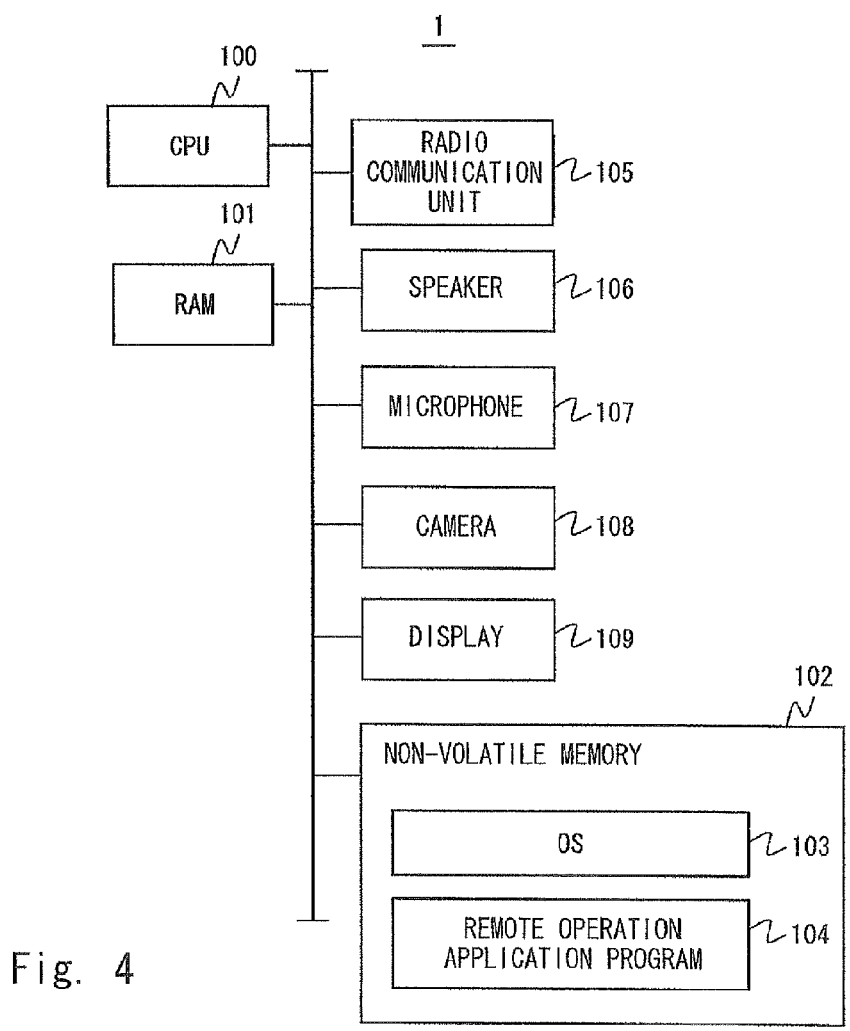
FIG. 4 is a block diagram showing a configuration example of the user terminal according to the first embodiment of the present invention.

FIG. 4 shows a specific configuration example when the user terminal 1 is a mobile telephone terminal. A radio communication unit 105 performs radio communication with a base station. A speaker 106 and a microphone 107 are used in a voice call, a videophone call and the like. A camera 108 acquires still pictures or moving pictures. A display 109 is an image display device, such as an LCD (Liquid Crystal Display) or an organic EL (Electro-Luminescence) display. An OS (Operating System) 103 and a remote operation application program 104 stored in a non-volatile memory 102 (e.g., flash memory or hard disk drive) are loaded in a RAM (Random Access Memory) 101. A CPU 100 executes a remote operation application program 104 loaded in the RAM 101, whereby functions of the registration data transmission unit 10, the registration restricting unit 14, and the operation/setting data reception unit 13 are achieved. Further, the function of the telephone function unit 15 is achieved by the cooperative operations of the CPU 100, the radio communication unit 105, the speaker 106, and the microphone 107.

Second Embodiment of the Present Invention

In this embodiment, a variant example of a remote operation system according to the first embodiment of the present invention will be described. In this embodiment, a function of suppressing transmission of registration data, which is needed to start a remote operation, is added to the user terminal 1 in order to improve the security. A configuration example of a remote operation system according to this embodiment is similar to that of the first embodiment shown in FIG. 1.

Figure 5:
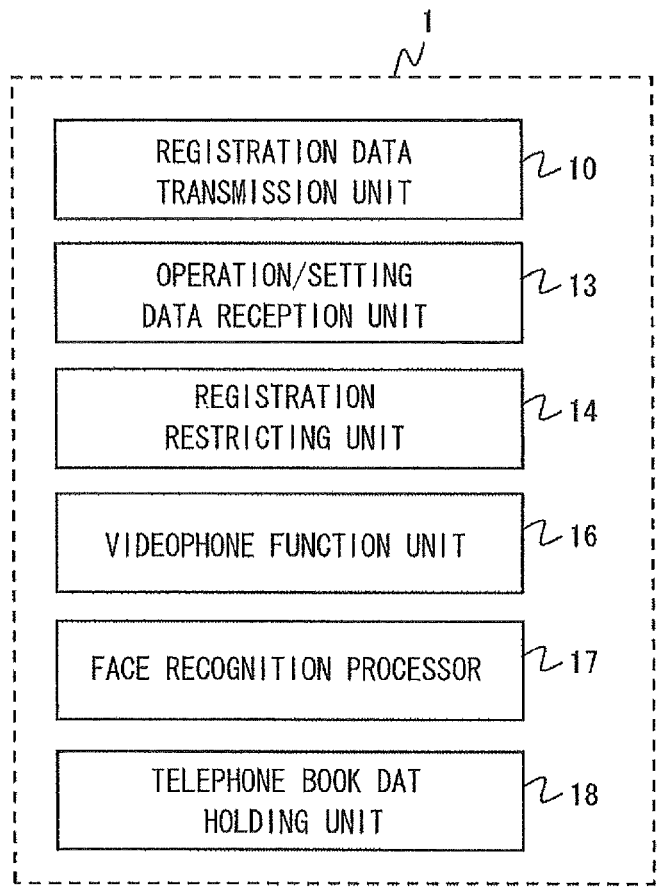
FIG. 5 is a block diagram showing a configuration example of a user terminal according to a second embodiment of the present invention.

FIG. 5 is a block diagram showing a configuration example of the user terminal 1 according to this embodiment. FIG. 5 only shows main components in this embodiment. The registration restricting unit 14 according to this embodiment allows transmission of the registration data to the mediation server 2 by the registration data transmission unit 10 on conditions that a videophone function unit 16 is performing a videophone call, and a person on the videophone call matches a person whose image is stored in the user terminal 1.

A face recognition processor 17 recognizes an image and features of a human face included in a picture. Further, the face recognition processor 17 determines, when two pictures are given, whether face images included in them are of substantially the same person. Any known face recognition processing may be applied as the processing by the face recognition processor 17. For example, a typical known face recognition processing is performed by detecting forms and positions of eyes, a mouth, a nose and the like as feature values.

A telephone book data holding unit 18 stores personal data (name, telephone number, e-mail address or the like) including images.

Figure 6:
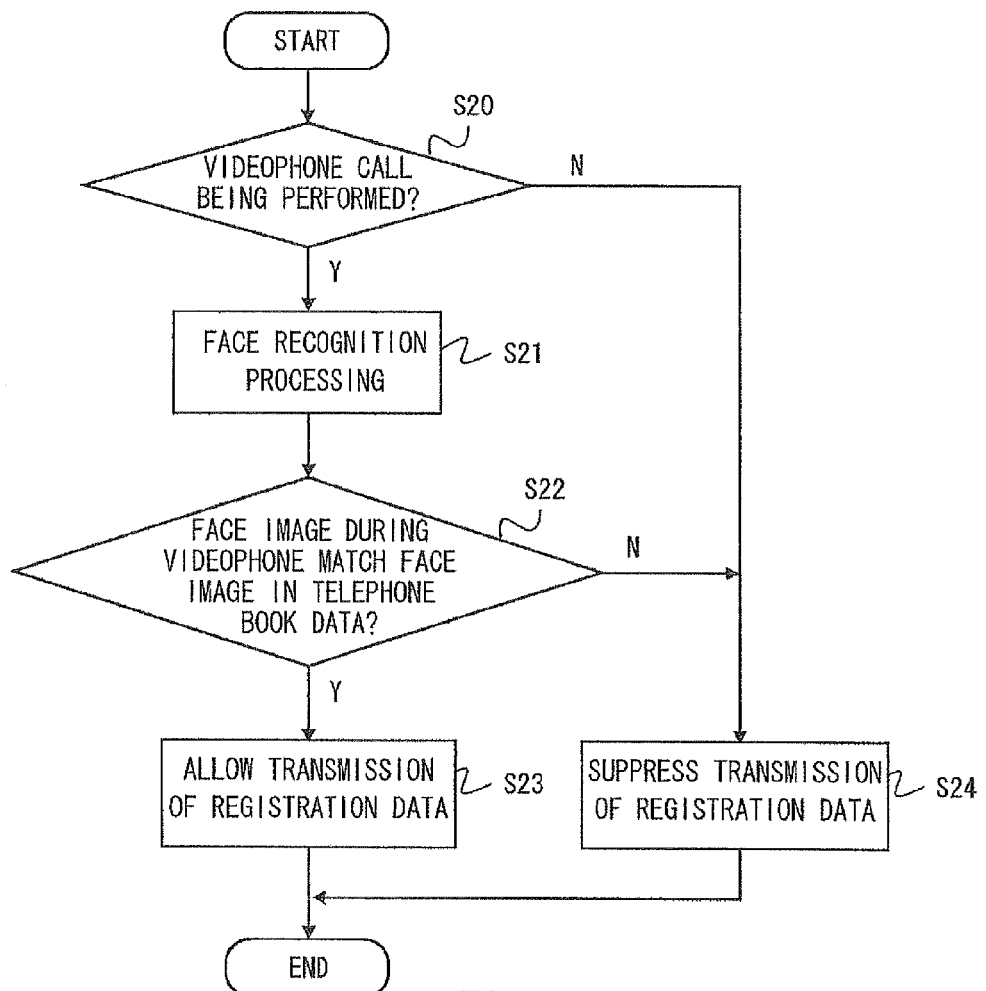
FIG. 6 is a flowchart showing a specific example of registration restricting processing by the user terminal according to the second embodiment of the present invention.

FIG. 6 is a flowchart showing a specific example of an operation of the registration restricting unit 14 according to this embodiment. In Step S20, the registration restricting unit 14 determines whether a videophone call is being performed by the videophone function unit 16. When a videophone call is not being performed, the registration restricting unit 14 suppresses transmission of the registration data (Step S24). Meanwhile, when a videophone call is being performed, the face recognition processor S31 performs face recognition processing to determine whether a face image recognized from a received picture received during the videophone call and a face image recognized from a person picture pre-stored in the user terminal 1 indicate substantially the same person (Steps S21 and S22). This determination may be performed by comparing a picture included in a personal data held in the telephone book data holding unit with the received picture received during the videophone call. When the two face images are determined to be of substantially the same person, the registration restricting unit 14 allows transmission of the registration data (Step S23). On the other hand, when the two face images are not determined to be of substantially the same person, the registration restricting unit 14 suppresses transmission of the registration data (Step S24).

According to this embodiment, a face of a person on the call is verified in addition to a communication voice, and a picture of the person on the call is compared with a picture pre-stored in the user terminal 1. Accordingly, in this embodiment, it is possible to further prevent such a situation where a remote operation is performed by a third party different from the supporter intended by the user, and to improve the security.

Further, as a variant example of this embodiment, when a face image recognized from a received picture received during the videophone call and a face image recognized from a person picture pre-stored in the user terminal 1 are not of substantially the same person, the registration restricting unit 14 may warn the user by warning display or warning sound using an output device (display, speaker or the like) included in the terminal 1. Accordingly, it is possible to further prevent such a situation where a remote operation is performed by a third party different from the supporter intended by the user.

Third Embodiment of the Present Invention

Figure 7:
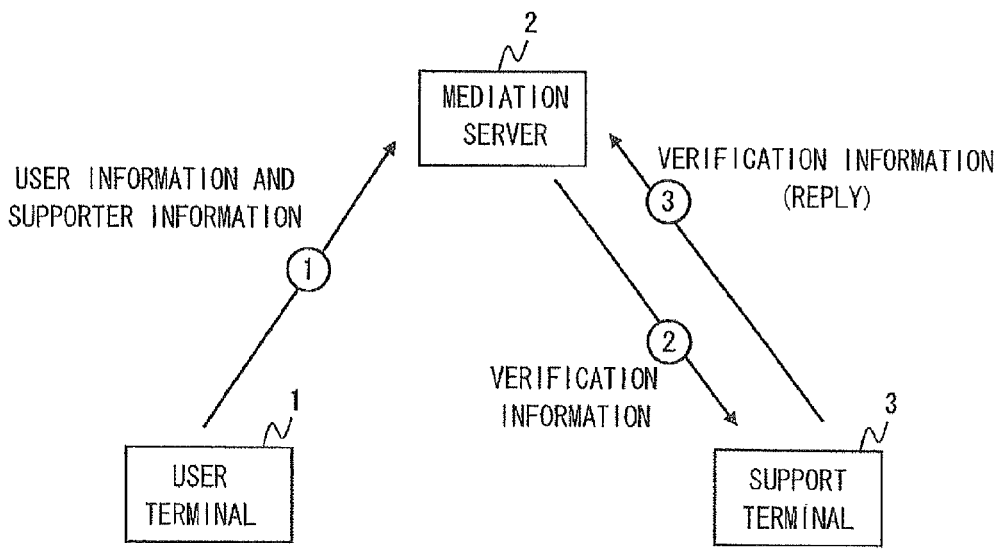
FIG. 7 is a conceptual diagram showing transmission/reception data in a remote operation system according to a third embodiment of the present invention.

In this embodiment, a specific example of a registration procedure performed by the mediation server 2 to start a remote operation of the user terminal 1 from the support terminal 3 will be described. FIG. 7 is a conceptual diagram showing transmission/reception data in this embodiment. In the registration procedure described in this embodiment, the mediation server 2 receives a registration data including user information and supporter information from the user terminal 1. The mediation server 2 stores the supporter information received from the user terminal 1 in association with the user information according to successful authentication of the support terminal 3. For example, the mediation server 2 may perform authentication of the support terminal 3 as follows. The mediation server 2 generates supporter verification information according to the reception of the supporter information, and transmits the supporter verification information to the support terminal 3 or an address that can be accessed from the support terminal 3. The supporter verification information is information transmitted from the mediation server 2 to the support terminal 3 in association with the procedure for registering the user terminal 1. The mediation server 2 may accept the connection from the support terminal 3, which has received the supporter verification information, to the mediation server 2, and compare information transmitted from the support terminal 3 after the connection with information determined from at least one of the supporter verification information, the user information, and the supporter information.

As a specific example, the mediation server 2 may perform authentication by receiving a reply of the correct supporter verification information from the support terminal 3 which has received the supporter verification information. Further, the mediation server 2 may receive personal information regarding the supporter from the support terminal 3 which has received the supporter verification information, and perform authentication according to match between this personal information and the personal information included in the supporter information received from the user terminal 1.

The supporter verification information may be, for example, a URL (Uniform Resource Locator) for registering the supporter or a one-time password. The transmission of the supporter verification information may be performed by transmitting an e-mail including the supporter verification information to an e-mail address of the supporter. For example, the mediation server 2 may authenticate the supporter (support terminal 3) by accepting, on a Web browser function of the mediation server 2, an access using a Web browser program from the support terminal 3 to the URL for registering the supporter, and receiving personal information of the supporter from the support terminal 3.

Figure 8:
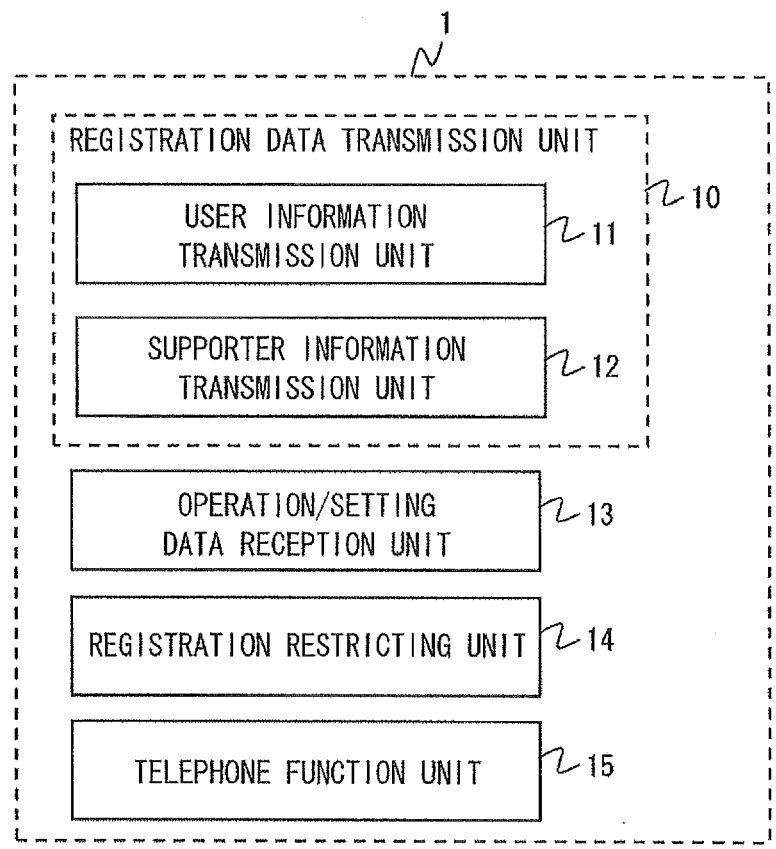
FIG. 8 is a block diagram showing a configuration example of a user terminal according to the third embodiment of the present invention.

In the following description, configuration examples of the user terminal 1, the mediation server 2, and the support terminal 3 according to this embodiment will be described in order. FIG. 8 is a block diagram showing a configuration example of the user terminal according to the third embodiment. A registration data transmission unit 10 shown in FIG. 8 includes a user information transmission unit 11 and a supporter information transmission unit 12. The user information transmission unit 11 transmits the user information associated with the user terminal 1 or the user to the mediation server 2 together with address information specifying the user terminal 1. The address information is able to reach the user terminal 1 via the network 4. For example, the address information may be an IP address assigned to the user terminal 1. In this case, a source address of a data packet including the user information may be used as the address information. As stated in the first embodiment, it is only required that the user information is information with which the user terminal 1 or the user can be identified.

The supporter information transmission unit 12 transmits to the mediation server 2 the supporter information associated with the support terminal 3 or the supporter which the user requests support by a remote operation. The supporter information may be transmitted together with the user information described above. It is only required that the supporter information is information with which the support terminal 3 or the supporter can be identified. The other components in FIG. 8 are similar to those shown in FIG. 2, and thus overlapping description will be omitted.

The functions of the user information transmission unit 11 and the supporter information transmission unit 12 may be implemented as an application program for registering the remote support service. When the application program is executed according to the operation of the terminal 1 by the user, the terminal 1 may output display to promote input of the user information and the supporter information to a display.

Figure 9:
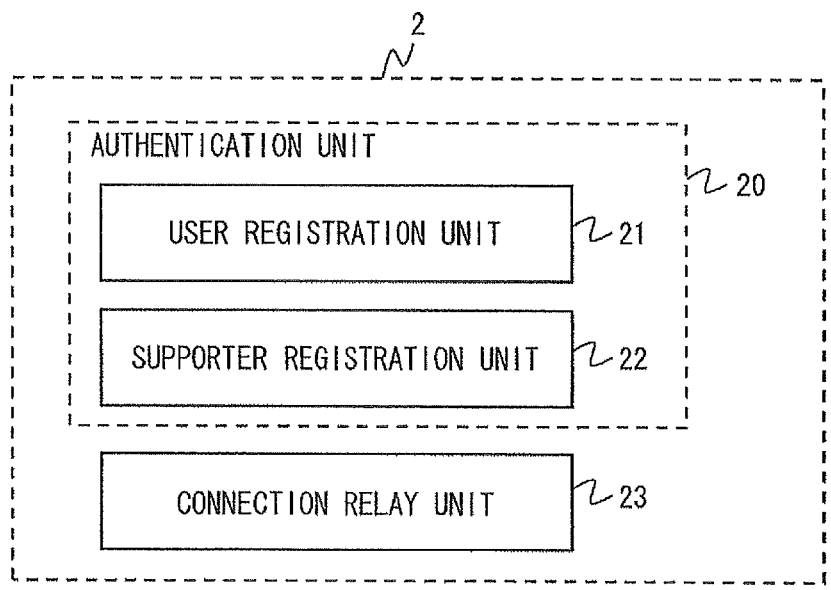
FIG. 9 is a block diagram showing a configuration example of a mediation server according to the third embodiment of the present invention.

FIG. 9 is a block diagram showing a configuration example of the mediation server 2. FIG. 9 only shows main components of this embodiment. An authentication unit 20 performs authentication of the support terminal 3 to start a remote operation of the user terminal 1. The authentication unit 20 includes a user registration unit 21 and a supporter registration unit 22. The user registration unit 21 stores the user information received from the user terminal 1.

The supporter registration unit 22 stores the supporter information received from the user terminal 1 in association with the user information on a condition that the authentication of the support terminal 3 stated above is successfully performed.

A connection relay unit 23 transmits or receives data regarding a remote operation (e.g., operation command, response, and setting data) transmitted between the support terminal 3 and the user terminal 1. More specifically, the connection relay unit 23 may authenticate the supporter by the personal information of the supporter received from the support terminal 3, allow search of the user information by the support terminal 3 that is authenticated, connect to the user terminal 1 using address information of the user terminal 1 stored in association with the user information, and transfer the operation/setting data received from the support terminal 3 to the user terminal 1. When a remote operation is performed using the direct connection between the user terminal 1 and the support terminal 3, it is only required that the mediation server 2 is able to provide the authentication service and the directory service when starting a remote operation, and the connection relay unit 23 may be omitted.

Figure 10:
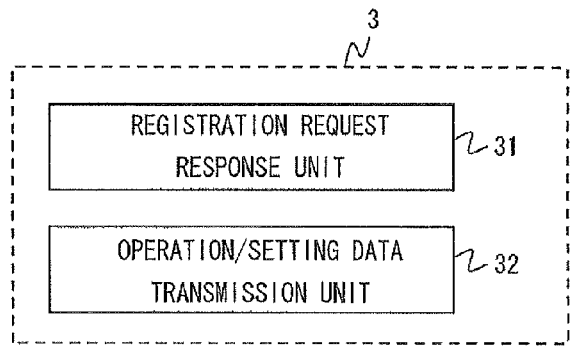
FIG. 10 is a block diagram showing a configuration example of a support terminal according to the third embodiment of the present invention.

FIG. 10 is a block diagram showing a configuration example of the support terminal 3. FIG. 10 only shows main components of this embodiment. A registration request response unit 31 is connected to the mediation server 2 using the supporter verification information received from the mediation server 2 to complete the authentication of the supporter (support terminal 3). For example, the registration request response unit 31 may be implemented with a Web browser.

An operation/setting data transmission unit 32 transmits data regarding remote operation/setting of the user terminal 1 to the mediation server 2 or the user terminal 1.

Figure 11:
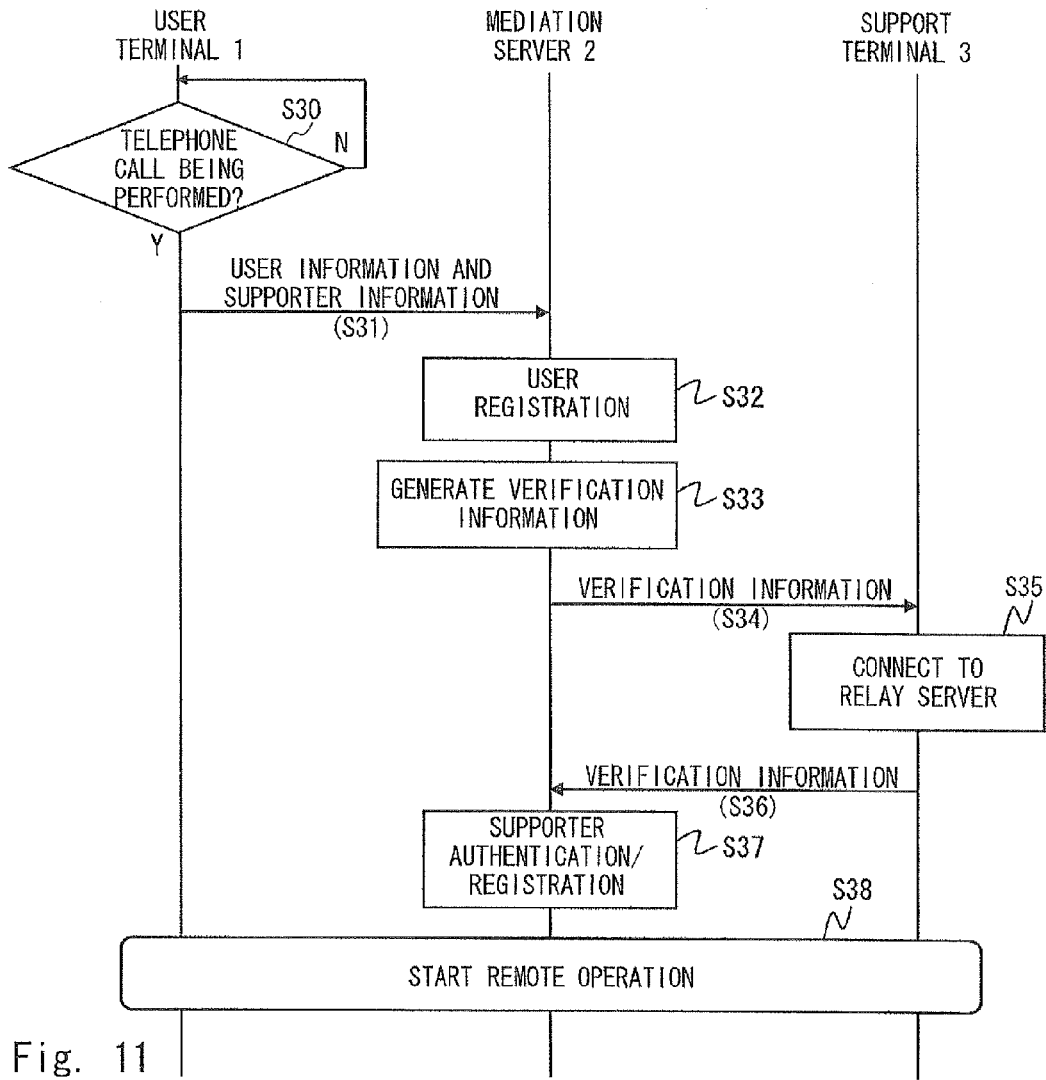
FIG. 11 is a sequence diagram showing a specific example of an authentication/registration procedure when starting a remote operation in the remote operation system according to the third embodiment of the present invention.

In the following description, with reference to FIG. 11, a specific example of the authentication/registration procedure when starting a remote operation in this embodiment will be described. In Step S30 in FIG. 11, the user terminal 1 checks whether a telephone call is being performed by the telephone function unit 15. When a telephone call is being performed by the telephone function unit 15 (YES in Step S30), the user terminal 1 transmits the user information and the supporter information as the registration data to the mediation server 2 (Step S31). For example, the user terminal 1 may start an application program for registering the remote support service according to the operation of the terminal 1 by the user, and perform Steps S30 and S31 according to the operations of inputting the user information and the supporter information.

In Step S32, the mediation server 2 stores the user information received from the user terminal 1. In Steps S33 and S34, the mediation server 2 generates the supporter verification information according to the reception of the supporter information from the user terminal 1, and transmits the supporter verification information to the support terminal 3. In Steps S35 and S36, the support terminal 3 is connected to the mediation server 2 according to the operation by the supporter who has viewed an e-mail including the supporter verification information, for example, and sends back the received supporter verification information. In Step S37, the mediation server 2 compares the supporter verification information that is sent back with the supporter verification information that has been transmitted. When the two verification information are matched, the mediation server 2 authenticates the support terminal 3, and stores the user information associated with the supporter information. In Step S38, a remote operation of the user terminal 1 from the support terminal 3 is started.

The remote operation system according to this embodiment suppresses transmission of the user information and the supporter information as the registration data when a telephone call is not being performed. Accordingly, as is similar to the first and second embodiments stated above, it is possible to prevent such a situation where a remote operation is performed by a third party different from the supporter intended by the user, and to improve the security. Further, according to the remote operation system in this embodiment, the user is able to transmit information necessary for the authentication to start a remote operation to the mediation server 2 by only inputting the user information and the supporter information. Thus, there is no need for the user to cooperate with the authentication procedure by operating the terminal 1 a number of times to authenticate the supporter (support terminal 3). In summary, according to this embodiment, it is possible to simplify the authentication procedure to start a remote operation. Accordingly, it is possible to easily start the remote support without any anxiety on the part of the user who is not familiar with the terminal operation.

Fourth Embodiment of the Present Invention

Figure 12:
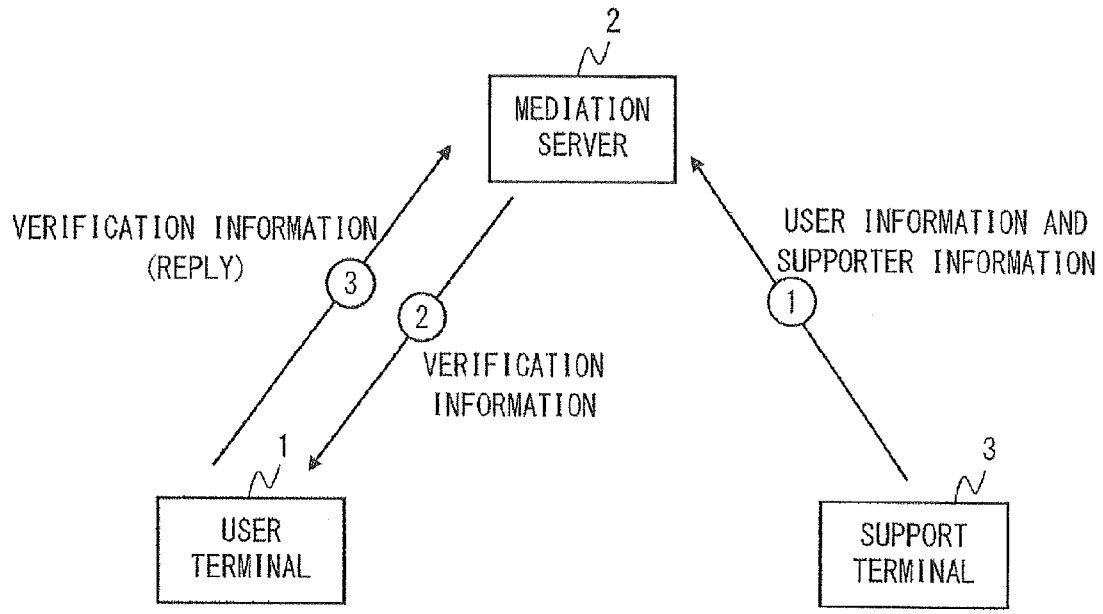
FIG. 12 is a conceptual diagram showing transmission/reception data in a remote operation system according to a fourth embodiment of the present invention.

In this embodiment, other specific examples of the registration procedure performed by the mediation server 2 when starting a remote operation of the user terminal 1 from the support terminal 3 will be described. FIG. 12 is a conceptual diagram showing transmission/reception data in this embodiment. According to the registration procedure in this embodiment, the mediation server 2 receives user information and supporter information as registration data from the support terminal 3. The mediation server 2 generates user verification information according to the reception of the user information and the supporter information from the support terminal 3, and transmits the user verification information to the user terminal 1 or an address that can be accessed by the user terminal 1 (e.g., an e-mail address of the user). The user terminal 1 then transmits the registration data to the mediation server 2 as a response to the user verification information. At this time, the user terminal 1 allows transmission of the registration data on a condition that the telephone function unit 15 is performing a telephone call. The mediation server 2 accepts the connection from the user terminal 3 that has received the user verification information to the mediation server 2, completes the user registration upon receiving the registration data from the user terminal 1, and allows a remote operation of the user terminal 1 from the support terminal 3.

The registration data transmitted by the user terminal 1 in this embodiment may include user verification information that the user terminal 1 received from the mediation server 2. Further, the registration data may be data transmitted by the user terminal 1 regarding an access to URL (Uniform Resource Locator) specified by the mediation server 2. Further, the registration data may be personal information including name, birth date, an e-mail address and the like of the user.

Figure 13:
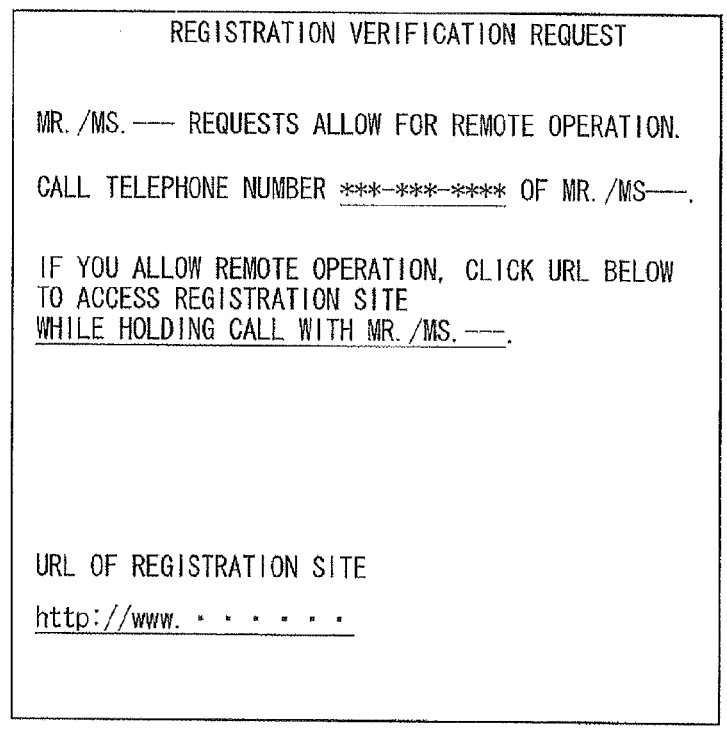
FIG. 13 is a diagram showing a specific example of an e-mail transmitted from a mediation server to a user according to the fourth embodiment of the present invention.

FIG. 13 shows a specific example of an e-mail that the mediation server 2 transmits to the user. In the example of FIG. 13, the e-mail from the mediation server 2 includes a telephone number of the supporter in addition to URL of a registration site as a specific example of the user verification information. The registration restricting unit 14 included in the user terminal 1 may allow an access to the URL of the registration site on conditions that the telephone function unit 15 is activated and it is confirmed that a telephone call is being made to the telephone number of the supporter specified by the e-mail. In other words, the registration restricting unit 14 may allow transmission of the registration data on a condition that the telephone function unit 15 and a terminal specified by the telephone number of the supporter specified by the mediation server 2 are in communication. The user verification information and the telephone number of the supporter may be separately transmitted to the user terminal 1 from the mediation server 2. When the user verification information transmitted from the mediation server 2 in advance is not used for the registration data, the mediation server 2 may transmit only the telephone number of the supporter to the user terminal 1, to allow transmission of the registration data on a condition that the telephone function unit 15 is in communication with the terminal specified by the telephone number of the supporter.

In this way, it is possible to use the fact that the user has verified the supporter on a telephone call to authenticate (allow a remote operation) the supporter. Accordingly, even a user who is not familiar with terminal operations is expected to be able to make a call relatively easily, and the user can find relief by talking with the supporter on a telephone call. In summary, according to the procedure described with reference to FIG. 13, it is possible to further relieve the user's anxiety, and to easily start the remote support.

Other Embodiments

While the third and fourth embodiments of the present invention have been described as variant examples of the first embodiment, they may be combined with the transmission restriction of the registration data by the user terminal 1 described in the second embodiment of the present invention.

Further, the function of restricting transmission of the data registered in the user terminal 1 described in the second to fourth embodiments of the present invention may also be implemented by causing a computer to execute a program, as is similar to the first embodiment of the present invention described above. The function of the mediation server 2 and the function of the support terminal 3 described in the third and fourth embodiments of the present invention are similar as well.

Furthermore, the present invention is not limited to the embodiments stated above, but may be variously changed without departing from the spirit of the present invention already stated above.

This application claims the benefit of priority, and incorporates herein by reference in its entirety, the following Japanese Patent Application No. 2010-202694 filed on Sep. 10, 2010.

REFERENCE SIGNS LIST

1 USER TERMINAL
2 MEDIATION SERVER
3 SUPPORT TERMINAL
4 NETWORK
5 TELEPHONE EQUIPMENT
6 NETWORK
10 REGISTRATION DATA TRANSMISSION UNIT
11 USER INFORMATION TRANSMISSION UNIT
12 SUPPORTER INFORMATION TRANSMISSION UNIT
13 OPERATION/SETTING DATA RECEPTION UNIT
14 REGISTRATION RESTRICTING UNIT
15 TELEPHONE FUNCTION UNIT
16 VIDEOPHONE FUNCTION UNIT
17 FACE RECOGNITION PROCESSOR
18 TELEPHONE BOOK DATA HOLDING UNIT
20 AUTHENTICATION UNIT
21 USER REGISTRATION UNIT
22 SUPPORTER REGISTRATION UNIT
23 CONNECTION RELAY UNIT
31 REGISTRATION REQUEST RESPONSE UNIT
32 OPERATION/SETTING DATA TRANSMISSION UNIT

The invention claimed is:

1. A mobile terminal, comprising:
a telephone function unit;
a transmission unit configured to transmit, through a data communication path to a mediation server that is remotely located from the mobile terminal, registration data regarding a remote operation of the mobile terminal from a support terminal;
a restriction unit configured to allow transmission of the registration data through the data communication path on a condition that the telephone function unit is currently communicating on a telephone call through a voice or video communication path;
a face recognition processing unit configured to recognize an image of a human face included in a picture,
wherein the telephone function unit supports a videophone, and
wherein the restriction unit allows the transmission of the registration data on a condition that the face recognition processing unit determines that a face image recognized from a received picture received while a videophone call is performed by the telephone function unit and a face image recognized from a person picture pre-stored in the mobile terminal indicate substantially a same person; and
a telephone book data holding unit capable of registering personal data including an image,
wherein the person picture compared with the received picture comprises an image included in the personal data held in the telephone book data holding unit.

2. The mobile terminal according to claim 1, wherein the restriction unit is configured to output a warning sound or a warning display when a call destination of the telephone function unit does not correspond to the support terminal or a supporter that uses the support terminal.

3. The mobile terminal according to claim 1, wherein the restriction unit is further configured to allow the transmission of the registration data on a condition that a call destination of the telephone function unit corresponds to the support terminal or a supporter that uses the support terminal.

4. The mobile terminal according to claim 3, wherein the restriction unit determines that the call destination of the telephone function unit corresponds to the support terminal or the supporter according to a match between a first telephone number stored in the mobile terminal in association with the support terminal or the supporter and a second telephone number of the call destination of the telephone function unit.

5. The mobile terminal according to claim 4, wherein the registration data includes supporter information associated with the support terminal or the supporter, and
wherein the first telephone number is stored in the mobile terminal in association with the supporter information.

6. The mobile terminal according to claim 1, wherein the restriction unit allows the transmission of the registration data on a condition that the telephone function unit is in communication with a terminal specified by a third telephone number transmitted from the mediation server or the support terminal to the mobile terminal prior to the transmission of the registration data.

7. The mobile terminal according to claim 1, wherein the telephone function unit supports the videophone, and wherein the restriction unit is configured to allow the transmission of the registration data on a condition that the telephone function unit is currently communicating on the videophone call.

8. A remote operation system, comprising:
a user terminal including a telephone function unit;
a support terminal;
a mediation server remotely located from the user terminal and the support terminal and configured to execute a registration procedure to start a remote operation of the user terminal from the support terminal,
wherein the user terminal is configured to allow transmission of registration data, regarding the remote operation, from the user terminal to the mediation server through a data communication path on a condition that the telephone function unit is currently communicating on a telephone call through a voice or video communication path;
a face recognition processing unit configured to recognize an image of a human face included in a picture,
wherein the telephone function unit supports a videophone, and
wherein the user terminal allows the transmission of the registration data on a condition that the face recognition processing unit determines that a face image recognized from a received picture received while the videophone call is performed by the telephone function unit and a face image recognized from a person picture pre-stored in the mobile terminal indicate substantially a same person; and
a telephone book data holding unit capable of registering personal data including an image, wherein the person picture compared with the received picture comprises an image included in the personal data held in the telephone book data holding unit.

9. The remote operation system according to claim 8, wherein the user terminal is configured to output a warning sound or a warning display when a call destination of the telephone function unit does not correspond to the support terminal or a supporter that uses the support terminal.

10. The remote operation system according to claim 8, wherein the user terminal is further configured to allow the transmission of the registration data on a condition that a call destination of the telephone function unit corresponds to the support terminal or a supporter that uses the support terminal.

11. The remote operation system according to claim 10, wherein the user terminal determines that the call destination of the telephone function unit corresponds to the support terminal or the supporter according to a match between a first telephone number stored in the user terminal in association with the support terminal or the supporter and a second telephone number of the call destination of the telephone function unit.

12. The remote operation system according to claim 11, wherein the registration data includes supporter information associated with the support terminal or the supporter, and
wherein the first telephone number is stored in the user terminal in association with the supporter information.

13. The remote operation system according to claim 8, wherein the user terminal allows the transmission of the registration data on a condition that the telephone function unit is in communication with a terminal specified by a third telephone number transmitted from the mediation server or the support terminal to the user terminal prior to the transmission of the registration data.

14. The remote operation system according to claim 8,
wherein the telephone function unit supports the videophone, and
wherein the user terminal is configured to allow the transmission of the registration data on a condition that the telephone function unit is currently communicating on the videophone call.

15. The remote operation system according to claim 8, wherein the registration data includes user information associated with the user terminal or a user that uses the user terminal, and supporter information associated with the supporter terminal or a supporter that uses the support terminal, and
wherein the registration procedure includes:
receiving, from the user terminal, the user information and the supporter information;
generating supporter verification information according to the reception of the supporter information, and sending the supporter verification information to a destination that can be accessed from the support terminal; and
accepting a connection from the support terminal which has acquired the supporter verification information, and allowing the remote operation according to a successful match between information transmitted from the support terminal after the connection and information determined from at least one of the supporter verification information, the user information, and the supporter information.

16. The remote operation system according to claim 8, wherein the registration procedure includes:
receiving, from the support terminal, user information associated with the user terminal or a user that uses the user terminal and supporter information associated with the support terminal or a supporter that uses the support terminal;
generating user verification information according to the reception of the user information, and sending the user verification information to an address that can be accessed from the user terminal; and
accepting a connection from the user terminal which has acquired the user verification information and allowing the remote operation according to a successful match between the registration data transmitted from the user terminal after the connection and information determined from at least one of the user verification information, the user information, and the supporter information.

17. A data transmission control method by a mobile terminal, said method comprising:
allowing transmission of registration data, regarding a remote operation of the mobile terminal with a support terminal, through a data communication path to a mediation server that is remotely located from the mobile terminal, on a condition that telephone function unit included in the mobile terminal is currently communicating on a telephone call through a voice or video communication path,
wherein the mobile terminal further includes face recognition processing unit configured to recognize an image of a human face included in a picture,
wherein the telephone function unit supports a videophone,
wherein the allowing includes allowing the transmission of the registration data on a condition that the face recognition processing unit determines that a face image recognized from a received picture received while a videophone call is performed by the telephone function unit and a face image recognized from a person picture pre-stored in the mobile terminal indicate substantially a same person, wherein the mobile terminal further includes telephone book data holding unit capable of registering personal data including an image, and wherein the person picture compared with the received picture comprises an image included in the personal data held in the telephone book data holding unit.

18. The method according to claim 17, further comprising outputting a warning sound or a warning display when a call destination of the telephone function unit does not correspond to the support terminal or a supporter that uses the support terminal.

19. The method according to claim 17, wherein the allowing includes allowing the transmission of the registration data on a condition that a call destination of the telephone function unit corresponds to the support terminal or a supporter that uses the support terminal in addition to a condition that a voice call or the videophone call is being performed by the telephone function unit.

20. The method according to claim 19, wherein the determination whether the call destination of the telephone function unit corresponds to the support terminal or the supporter is performed by determining whether a first telephone number stored in the mobile terminal in association with the support terminal or the supporter matches a second telephone number of the call destination of the telephone function unit.

21. The method according to claim 20, wherein the registration data includes supporter information associated with the support terminal or the supporter, and the first telephone number is stored in the mobile terminal in association with the supporter information.

22. The method according to claim 17, wherein the allowing includes allowing the transmission of the registration data on a condition that the telephone function unit is in communication with a terminal specified by a third telephone number transmitted from the mediation server or the support terminal to the mobile terminal prior to the transmission of the registration data in addition to a condition that the telephone function unit is currently communicating on a voice call or the videophone call.

23. The method according to claim 17, wherein the telephone function unit supports the videophone, and wherein the allowing includes allowing the transmission of the registration data on a condition that the telephone function unit is currently communicating on the videophone call.

24. A non-transitory computer readable medium storing a program to cause a computer to execute the data transmission control method according to claim 17.

* * * * *